June 23, 1925.

A. H. GAUSDEN

GEYSER

Filed Nov. 18, 1924

1,543,564

2 Sheets-Sheet 2

INVENTOR
Alfred H. Gausden
BY
ATTORNEY

Patented June 23, 1925.

1,543,564

UNITED STATES PATENT OFFICE.

ALFRED H. GAUSDEN, OF CROYDON, ENGLAND.

GEYSER.

Application filed November 18, 1924. Serial No. 750,628.

*To all whom it may concern:*

Be it known that ALFRED HERMANN GAUSDEN, a subject of the King of Great Britain, residing at 215 London Road, Croydon, in the county of Surrey, England, has invented certain new and useful Improvements in Geysers, of which the following is a specification.

This invention relates to geysers of the instantaneous hot water type, and of the kind wherein the water to be heated is caused to ascend within an annular casing and then to overflow over a nest of plates arranged within said casing above a heating element; the invention having for its object a simple and inexpensive construction whereby to ensure the transference to the water as rapidly as possible of the maximum amount of heat emitted by the heating element with resultant economy in fuel consumption. The invention also has for its object a construction of geyser which may be readily dismantled for cleaning or repair.

Accordingly it comprises a geyser of the kind specified in which at the top of the annular chamber the water is divided into a plurality of streams which flow by gravity over a succession of spirally corrugated and apertured dished metal pans arranged above the heating element, the lowermost pan being in communication with a delivery spout for the heated water. The supply water is thus thoroughly divided up before subjection to the hot gases ascending within the casing and it is also well distributed in its passage over and through said trays.

The casing is removably and adjustably supported by a pedestal or base carrying the heating element, which pedestal is preferably constructed so as to receive any condensation water.

Figure 1:
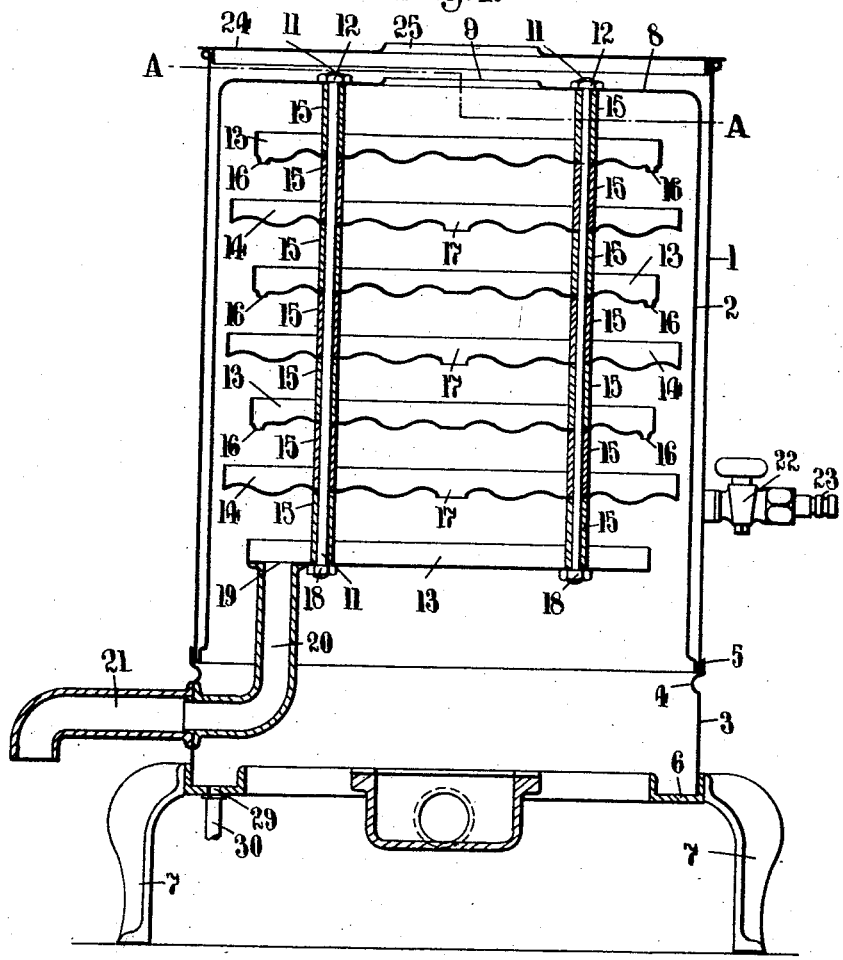
Figure 2:
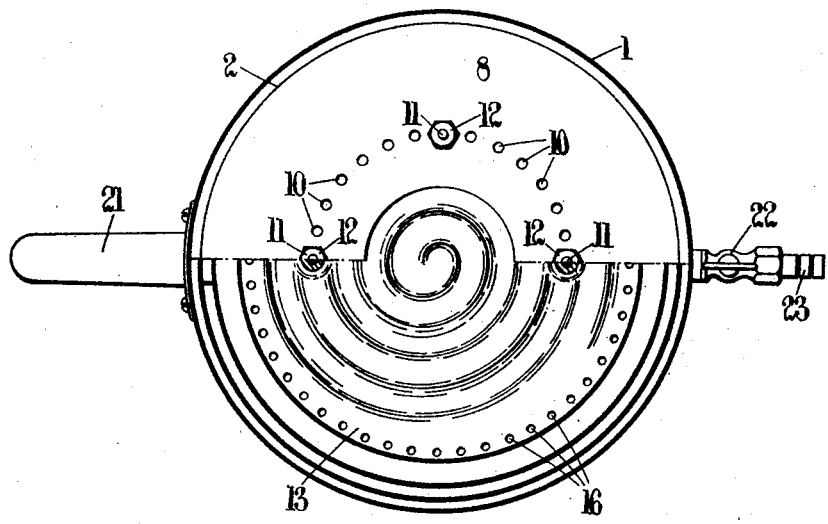
Figure 3:
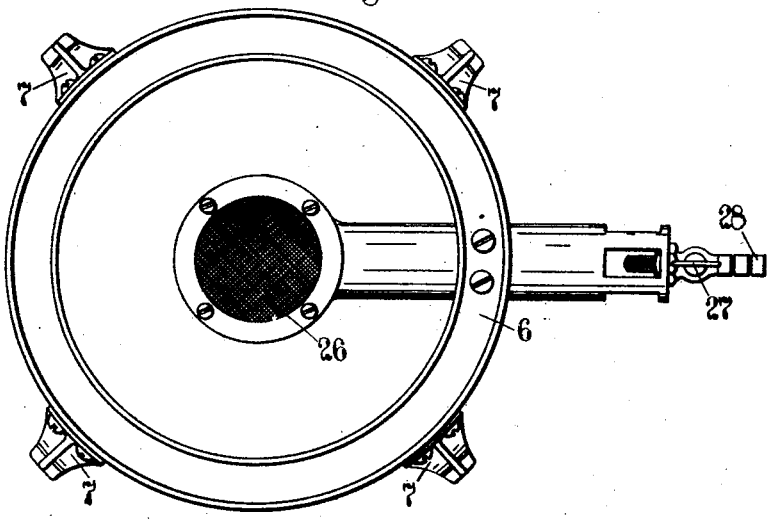

One embodiment of the invention is illustrated by way of example in the accompanying drawings in which Figure 1 is a vertical section. Figure 2 is a sectional plan view on a line at 180° to line A—A of Figure 1, and Figure 3 is a plan view of the heating element and pedestal.

1, 2, are the outer and inner walls respectively of an annular sheet metal casing, which walls are welded, sweated, brazed or otherwise suitably joined in a watertight manner at their bottom edges, the lower margin of the inner wall 2 being offset to compensate for the effective water space separating the walls.

The casing rests freely on a circular sheet metal wall 3 formed with a circumferential corrugation 4 and an upstanding flange 5 or otherwise suitably constructed or arranged to receive and support the lower edge of the casing; and said sheet metal wall 3 rests on a cast iron or other suitable pedestal or base consisting of an annular trough 6 having supporting legs 7.

Welded, sweated, brazed or otherwise suitably secured to, or formed in one with, the top of the inner wall 2 of the casing is a circular plate 8 formed centrally with an aperture surrounded by an upstanding flange or lip 9. This plate 8 is also perforated concentrically of said aperture with a series of apertures 10 (see Figure 2) and the plate 8 also has suspended from it, by means of four rods 11 and nuts 12, a nest composed of two series 13 and 14 of dished and spirally corrugated sheet metal pans, the series 13 being of smaller diameter than the series 14, said pans constituting a device for spreading or increasing the surface of the water so as to cause a maximum rate of heat interchange between the water and the hot products of combustion arising from the burner.

These pans 13 and 14 are apertured to fit on to the four rods 11, each of which carries tubular distance pieces 15 to effect the desired spacing between adjacent pans.

Each of the pans 13, except the lowermost pan of that series, is formed near its circumference with a series of apertures 16, and each of the pans 14 is formed centrally with an aperture 17, each of said apertures being surrounded by a small downwardly depending flange.

The lowermost pan of the series 13 is secured at the bottom end of the rods 11 by four nuts 18 and has an aperture near one edge below which aperture is secured a flange pipe 20 leading to a delivery spout 21.

22 is a cock or valve attached to the wall 1 of the casing and carrying a spigot 23 to which a flexible or other tube (not shown) may be attached in order to connect said valve 22 with a source of water under pressure, such as an ordinary service tap of a domestic water service installation.

24 is a flanged lid or cover plate fitted removably to the top of the casing and provided centrally with a flanged aperture 25.

26 is a gas burner, of the Bunsen type, which is suitably supported by means integral with or attached to the frame or trough 6 and is provided with a controlling cock or valve 27 and with a spigot 28 for connection to a gas supply pipe.

The annular frame or trough 6 serves to receive any condensation water which may be drained off therefrom through an aperture 29 therein below which is a drain tube 30.

Instead of being fitted with a gas burner as illustrated the geyser may be provided with a burner adapted to consume petrol gas or to burn paraffin or acetylene gas, and in some cases the installation may be constituted a self-contained unit by fitting adjacent the casing a container or tank say for paraffin. The fact that the casing remains relatively cool while the geyser is in operation enables this arrangement to be utilized with perfect safety.

In operation the heating element is lighted and the supply water is admitted at main pressure through the valve or cock 22 and, after rising and filling the space between the walls 1 and 2, it percolates in the form of a plurality of streams through the series of apertures 10 in the top plate 8 and falls on to the uppermost pan 13 of that series and thence by way of the apertures 16 therein it percolates once more in the form of a plurality of streams on to the uppermost pan 14 of that series. Meanwhile the hot gases from the heating element are rising within the casing, some passing up the circumferential space surrounding the peripheries of the plates 13 and 14 and some finding their way between the pans.

From the uppermost pan 14 the water passes by way of the central aperture 17 therein on to the second pan 13 wherefrom it continues to flow by gravity downwardly from pan to pan until finally it reaches the lowermost or hottest pan of the series 13 and therefrom it leaves by way of aperture 19, flanged pipe 20 and delivery spout 21.

Once the apparatus has been set into operation the heating of the water is very rapid, the efficiency of the apparatus in this respect being enhanced by the insulated jacketing effect produced by the annular wall of constantly flowing supply water which effectually prevents or reduces to negligible proportions any heat losses by radiation.

What I claim is:

1. A geyser comprising a base supporting a burner, a casing having a double lateral wall removably seated upon said base, said casing having an inner top wall, and a removable cover forming an outer top wall spaced from said inner wall, rods removably suspended from said inner top wall, said rods being accessible for removal, by removing said cover, a series of superposed water pans carried by said rods, said casing being provided with a water outlet positioned to permit a flow of water from said casing into the uppermost of said pans, the latter being apertured to permit the flow of water from one pan to another.

2. A geyser comprising a base supporting a burner, a casing having a double lateral wall, removably seated upon said base, said casing having an inner top wall, and a removable cover forming an outer top wall spaced from said inner wall, said cover and inner top wall being centrally apertured to provide a flue for said casing, rods removably suspended from said inner top wall, said rods being accessible for removal by removing said cover, water pans carried by said rods in superposed relation, said casing being provided with a water outlet positioned to permit the flow of water from said casing into the uppermost of said pans, the the latter being formed with apertures permitting the flow of water from one pan to another, said pans being of such size as to provide a direct annular passage for the combustion gases, between said pans and casing extending from said burner to said flue.

3. A geyser comprising a base supporting a burner, a casing having a double lateral wall, removably seated upon said base, said casing having an inner top wall, and a removable cover forming an outer top wall spaced from said inner wall, said cover and inner top wall being centrally apertured to provide a flue for said burner, rods removably suspended from said inner top wall, said rods being accessible for removal, by removing said cover, water pans carried by said rods, spacers on said rods between said pans for maintaining them in spaced relation, the inner top wall of said casing being formed with an overflow above said pans, the latter being alternately, peripherially and centrally apertured to permit water overflowing from said casing to spread in said pans and descend from pan to pan alternately in peripheral and central showers, said pans being of such size as to provide a direct annular passage for the combustion gases between said pans and casing from said burner to said flue.

In testimony whereof I affix my signature.

ALFRED H. GAUSDEN.